June 23, 1953  F. G. DU PONT  2,642,741
TRANSIENT FORCE MEASURING DEVICE
Filed March 14, 1951  3 Sheets-Sheet 1

INVENTOR.
Francis G. DuPont
BY
John H. Lewis Jr.
ATTORNEYS

June 23, 1953     F. G. DU PONT     2,642,741
TRANSIENT FORCE MEASURING DEVICE
Filed March 14, 1951     3 Sheets-Sheet 3

INVENTOR.
Francis G. DuPont
BY
ATTORNEYS

Patented June 23, 1953

2,642,741

UNITED STATES PATENT OFFICE 2,642,741

TRANSIENT FORCE MEASURING DEVICE

Francis G. du Pont, Fairfield, Conn., assignor to Remington Arms Company, Inc., Bridgeport, Conn., a corporation of Delaware Application March 14, 1951, Serial No. 215,601

12 Claims. (Cl. 73—167)

This invention relates to electrical means of measuring and/or recording a compressional or tensional force and has particular application to the measurement of the force applied by one relatively free body to another such body.

A field in which this invention has been particularly useful is the recordation of the force applied to the shoulder of a human shooter by the firing of a gun more or less flexibly supported by the arms of that shooter. In attempting to correlate the subjective sensation of pain, etc., accompanying the discharge of powerful firearms, it became necessary to obtain actual shoulder force/time curves. This problem was considerably complicated by the fact that no shooter presents a rigid support to the butt of a firearm. Obviously, a thin light shooter; a heavy, but soft and flabby shooter; and a heavy, hard muscled shooter, each present a widely different problem.

Previous attempts at shoulder force measurement have involved the use of a butt plate separate from the actual buttstock of the firearm and connected thereto by a measuring element, such as a crystal gage or a compression strut having strain gages thereon, adapted to indicate the compressional force. In all such cases, however, the butt plate was a member of considerable inertia and was subject to translational acceleration not necessarily or even frequently identical with that of the firearm per se. Further, all of such devices employed were sensitive, in addition, to one or more other errors arising from thermal effects, bending stresses, and calibration difficulty.

The principal object of my invention is the production of a force measuring device which is compensated against effects arising out of translational movement and thermal effects and is wholly insensitive to direct compression, tension, or flexure of the measuring element. Obviously, a device which meets these requirements for recoil force measurement will be equally applicable to measuring the forces exerted between any other two free bodies.

I contemplate that I can best achieve this objective by mounting a torsion tube or tubes on the buttstock, which receives the recoil force of the firearm. By suitable linkage, force exerted against a relatively free butt plate may be converted to equal and opposite couples applied to the remote ends of the torsion tube. At diametrically opposed locations, counter-weights are provided and similarly linked to the torsion tube to provide compensation for the inertial effects of translation on the mass of the butt plate and other force transmitting portions of the system. Torque measuring apparatus of the type disclosed in Ruge Patent No. 2,392,293, issued January 1, 1946, may be employed with great facility for measuring the torque in the tube. As explained in the Ruge patent, the electrically sensitive strain gage bridge described is not affected by thermal effects or by tension, compression, or bending forces applied to the torque tube. Preferably, the strain gage bridge will be utilized as an alternating current bridge, being supplied in known fashion with constant voltage alternating current of any suitable frequency, 1000 cycles per second having been found highly satisfactory. Under zero torque conditions, assuming the bridge to be balanced exactly, the voltage across the output terminals of the bridge will be zero. As the torque applied to the gage tube varies, the output voltage will vary in proportion and will appear as a full wave alternating current voltage modulated in proportion to the intensity of the force applied to the gage tube. For constant or slowly varying forces, this voltage may be read by any alternating current instrument suitable for the voltage and frequency employed. For transient conditions I have found it most suitable to apply the output voltage to the vertical deflection plates of a single sweep photographically recording oscillograph, initiating the horizontal sweep very shortly before the application of the force to be measured.

The exact nature of the invention as well as other objects and advantages thereof will be more apparent from consideration of the following specification referring to the attached drawings in which.

Figure 1:
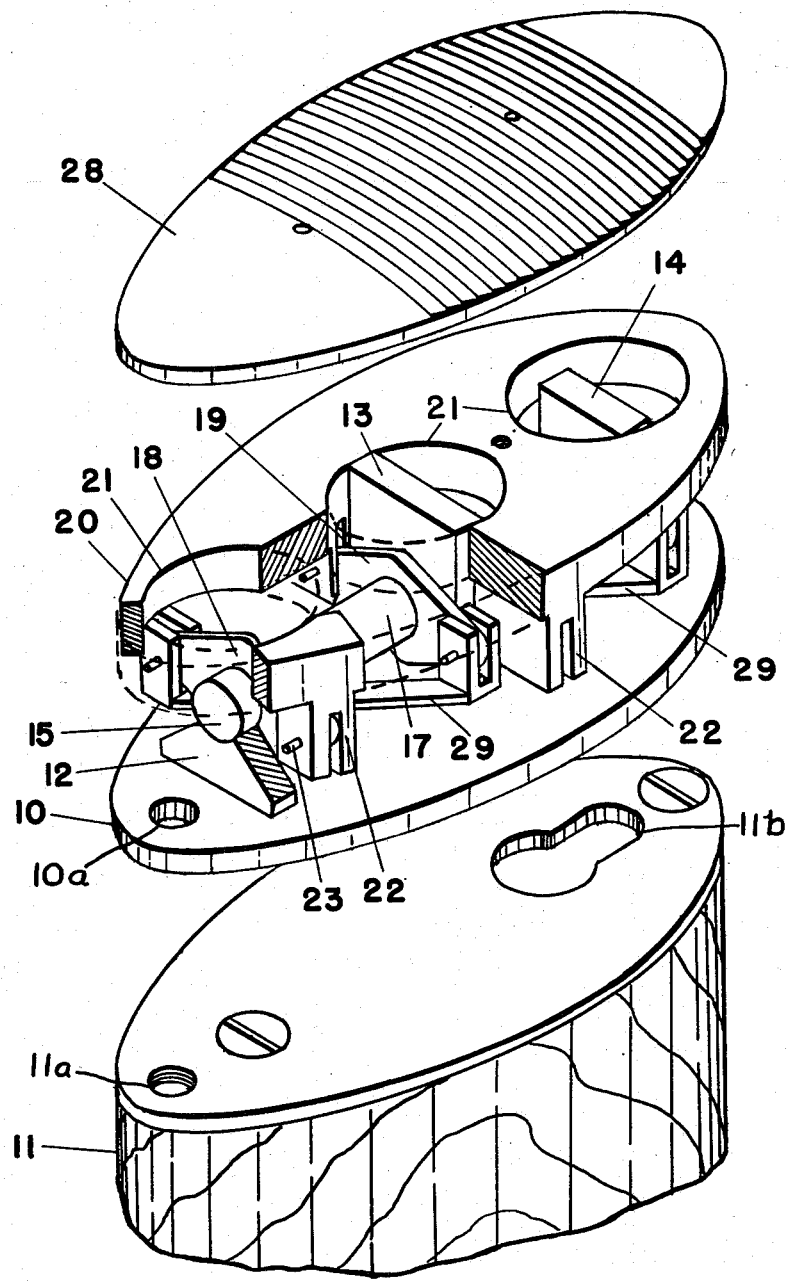
Fig. 1 is an exploded perspective representation of the preferred mechanical arrangement of my gage.

Referring to the drawings by characters of reference, it can be seen that the preferred embodiment comprises a force receiving base plate 10 arranged to be secured in any convenient way, as by a screw, not shown, extending through a hole 10a into threaded opening 11a and by a lug 10b engaging keyhole slot 11b, to a buttstock 11 of a gun or to any other device whose force is to be measured. The base plate has secured thereon stanchions 12, 13, and 14 which are coaxially bored to receive a shaft 15.

Between the stanchions there are mounted on the shaft 15, for free rotation within limits imposed by the proximity of the base plate, a pair of identical gage elements each comprising a precisely formed tubular section 17 made integral with end flanges 18 and 19, each of the end flanges being symmetrically bored to provide attachment points thereon.

A force transmitting thrust plate 20 is provided with holes 21, the central one of these holes receiving the stanchion 13 with a sliding fit to thus guide the thrust plate or prevent rotation thereof about the axis of the shaft. The inner face of the thrust plate is formed to provide suitably spaced brackets 22, each of which embraces one of the end flanges of a gage element 16 and is attached thereto by a pin 23 passing through the bores in the flange. As will be noted, the two points of attachment of the thrust plate to each gage element are diametrically opposed and obviously any force tending to move the thrust plate nearer to or farther from the base plate will result in the application of a torsion strain to the tubular portion 17 of each gage element.

Figure 2:
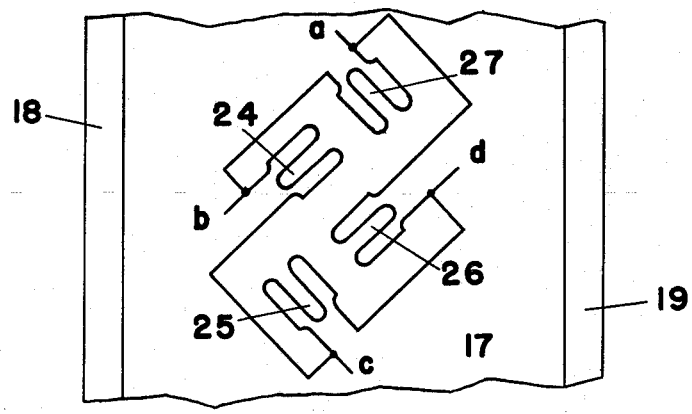
Fig. 2 is a development of the surface of one of the tubular gage elements illustrating the placing of the strain gages thereon.

As shown in the development of the surface of the gage element in Fig. 2, four active strain gage elements 24, 25, 26, and 27 are mounted on the portion 17 in the 45° pattern described in more detail in the Ruge patent above referred to, and these strain gages are connected in a suitable bridge circuit to produce an electrical indication of the intensity of the torsional strains in the gage element.

For convenience in the gun recoil measuring application, a conventional butt plate 28 may be attached to the thrust plate, but obviously any other type of thrust or pull receiving fitting may be provided for other applications.

To eliminate the effects of translational acceleration of the movable components, I provide a pair of inertia weights 29, which together have a mass identical to that of the thrust plate and butt plate, and attach these weights to the end flanges 18 and 19 of the gage elements by pins 23a at locations diametrically opposite to the locations where the thrust plate is attached. To aid in counterbalancing, I prefer to form the thrust plate and butt plate from relatively light materials, aluminum and molded plastic having been found satisfactory, while the inertia weights are formed of heavier material such as brass, or brass with lead inserts reducing the bulk required for the counterweights.

In the embodiment shown, I have employed two substantially identical gage units for the reason that the multi-point support of the thrust plate enables lighter construction and permits the use of simpler guiding means for the thrust plate. Obviously, similar results will be obtained by the use of a single gage unit, provided the thrust plate has adequate rigidity and is suitably supported for reciprocation in a direction substantially normal to the base plate.

Figure 3:
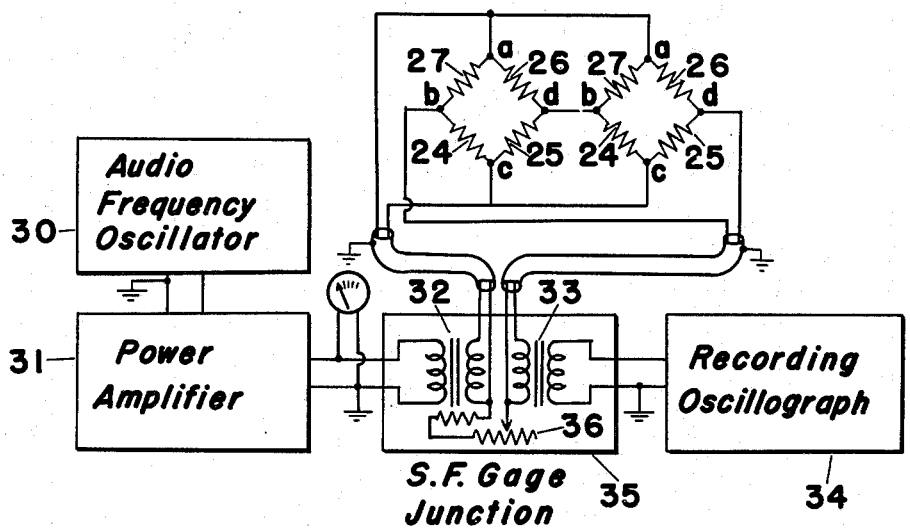
Fig. 3 is a schematic wiring diagram.

Considering Fig. 3, it may be seen that I have connected the two strain gage networks in a series parallel arrangement which somewhat improves the sensitivity, although it should be fairly obvious that, with proper impedance matching, other arrangements, for example, a parallel hook-up, could be used with almost equal facility. In the example illustrated I have used as my source of alternating current an audio-frequency oscillator 30. This oscillator should be one which can be relied upon to maintain a substantially stable output voltage and I have found it convenient for timing purposes to use a frequency of 1000 cycles per second. The output of the oscillator is preferably fed through a power amplifier 31 and an impedance matching transformer 32 to the parallel connected input terminals A—A and C—C of the strain gage bridges. The output terminals B, D, B, and D of the bridges are shown connected in series so that the unbalance potentials are additive and are led through an impedance matching transformer 33 to a recording oscillograph 34, preferably of the single sweep, photographically recorded type.

To reduce stray interference pick-ups, the leads to and from the bridge circuits are preferably shielded and may be conveniently terminated in a junction box 35 enclosing the matching transformers 32 and 33. Conveniently, the frame and metal parts of the gage may be connected to the cable shield and through that shield connected to the common ground of the system. The junction box also provides a convenient mounting for a balancing resistor 36 which permits balancing the bridge to a null output under conditions of zero thrust exerted on the butt plate unit.

Figure 4:
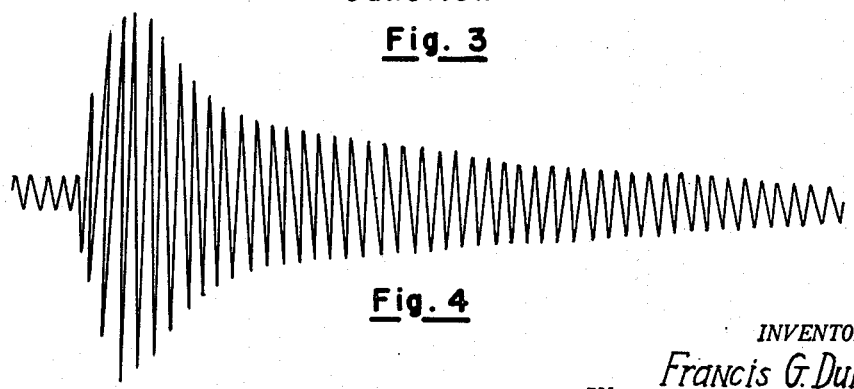
Fig. 4 is a typical recoil force/time record produced by the practice of the invention.
Figure 5:
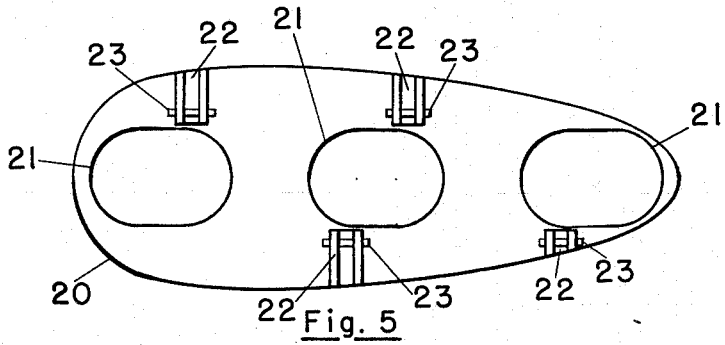
Fig. 5 is a bottom plan view of the thrust plate.
Figure 6:
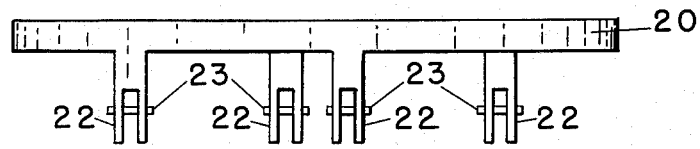
Fig. 6 is a side elevational view of the thrust plate.
Figure 7:
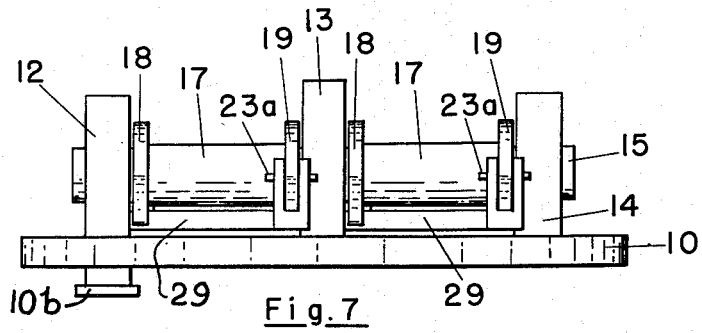
Fig. 7 is a side elevational view of the base plate assembly.
Figure 8:
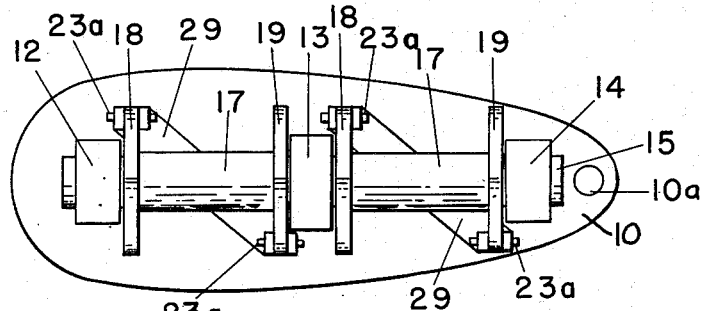
Fig. 8 is a top plan view of the base plate assembly.

With the bridge so balanced, the gun may be fired, preferably with a trigger unit combining means for electrical synchronization of the start of the recording oscillograph. Fig. 4 shows the record obtained from one such operation. In this record, the low amplitude oscillation at the left hand edge represents the steady approximately 7# pressure with which this shooter shouldered the gun. After firing, the shoulder force built up rapidly to a peak of about 215# and then dropped off with equal rapidity before a further reduction at a gradual rate. At the end of the record the shoulder force was still appreciably higher than the normal hold of this shooter. On this record, time is indicated in milliseconds as each cycle of the alternating current wave traced took $\frac{1}{1000}$ second, and instantaneous force at any time may be determined by measuring the peak-to-peak amplitude of the wave. From this basic data a force/time curve may be plotted, and recoil acceleration, and work done during recoil may be calculated.

Obviously, a unit of this character may be employed to secure similar records when suitably mounted in any pushing or pulling mechanism as, for example, on the ram of a metal drawing press. Its unique advantage, however, as previously noted, consists in its ability to obtain relative force records in systems subjected to severe accelerational or decelerational forces. Examples other than gun shoulder force might be found in the measuring of the forces between a pile driver hammer and a driven pile, where both are relatively free bodies, or in obtaining records of the relative forces between elements of the control linkage or other mechanical systems in a rocket, guided missile, or other projectile.

Although I have illustrated only one form and one application of my invention, I wish it to be clearly understood that I do not consider my invention to be limited thereto. For an exact definition of the limits upon my invention, reference may be had to the claims appended hereto.

I claim:

1. For use in a system including a force receiving member and a force transmitting member, a transient force measuring device comprising in combination an axle rigidly supported relative to one of said members, said axle extending transversely to the axis along which the force to be measured is applied; a tubular sleeve rotatably supported on said axle; radially extending flange means on each end of said sleeve and formed integrally therewith; first attachment means pivotally securing the other one of said members to a point on one of said end flanges; second attachment means pivotally securing said other one of said members to a point on the other of said end flanges, said points of first and second attachment being substantially equidistant from opposite sides of a plane including the axis of said tubular sleeve; and means to measure the torsion strain in said tubular sleeve as force is transmitted therethrough from one of said members to the other of said members.

2. A transient force measuring device as described in claim 1, including a counterweight; and pivotal attachment means securing said counterweight to a point on each of said end flanges, said points being each diametrically opposite to the point of attachment of the corresponding one of said flanges to said other one of said members, the product of the mass and moment arm of said counterweight being substantially equal to the product of the mass and moment arm of the said other one of said members.

3. A transient force measuring device as described in claim 2, said torsion strain measuring means including at least one electrically strain sensitive filament bonded to the surface of said sleeve and disposed at an angle to the shear planes created in said sleeve as the result of torsion strains therein.

4. A transient force measuring device as described in claim 3, including two pairs of said electrically strain sensitive filaments, each pair being bonded to said sleeve and disposed thereon at angles of similar magnitude and opposite sign relative to said shear planes, said filaments being electrically interconnected to form a torque sensitive Wheatstone bridge circuit.

5. For use in a system including a force receiving member and a force transmitting member, a transient force measuring device comprising in combination an axle rigidly supported relative to said force receiving member, said axle extending transversely to the axis along which the force to be measured is applied; a tubular sleeve rotatably supported on said axle; a pair of flanges formed integrally with said sleeve, one of said flanges extending radially from each end of said sleeve; first attachment means pivotally securing said force transmitting member to a point on one of said flanges; second attachment means pivotally securing said force transmitting member to a point on the other one of said flanges, said attachment points being substantially uniformly spaced on opposite sides of a plane including the axis of the sleeve; and means to measure the torsional strain in said sleeve as force is transmitted therethrough from said force receiving member to said force transmitting member.

6. A transient force measuring device as described in claim 5, including a counterweight having a mass equal to that of said force transmitting member; and pivotal attachment means securing said counterweight to a point on each of said end flanges, the point of attachment of the counterweight to each flange being diametrically opposite to the point of attachment of the same flange to said force transmitting member and radially equidistant from the axis of said sleeve.

7. A transient force measuring device as described in claim 6, said torsion strain measuring means including four electrically strain sensitive filaments bonded to the surface of said sleeve and disposed thereon alternately at angles of equal magnitude and opposite sign relative to the shear planes created in said sleeve as the result of torsion strains therein, said filaments being electrically interconnected to form a torque sensitive Wheatstone bridge circuit.

8. For use in a system including a force receiving member and a force transmitting member, a transient force measuring device comprising in combination stanchions rigidly supported on said force receiving member, said stanchions being formed to define guides interengaged with said force transmitting member to permit only reciprocation thereof relative to said force receiving member; an axle journaled in said stanchions, said axle extending transversely to the axis along which the force to be measured is applied; a tubular sleeve rotatably supported on said axle; a pair of flanges formed integrally with said sleeve, one of said flanges extending radially from each end of said sleeve; attachment means pivotally attaching said force transmitting member to one point on each of said flanges, said points being substantially equally spaced from a plane including the axis of the said axle and substantially co-linear with the direction of force application to the force receiving member; counterweight means having a mass substantially equal to that of the force transmitting member; pivotal attachment means securing said counterweight to each of said flanges at a point diametrically opposite the point of attachment to said force transmitting member and radially equidistant from the axis of said sleeve; and means to measure the torsion strain in said sleeve.

9. For use in a system including a force receiving member and a force transmitting member, a transient force measuring device comprising in combination stanchions rigidly supported on said force receiving member, said stanchions being formed to define guides interengaged with said force transmitting member to permit only reciprocation thereof relative to said force receiving member; an axle journaled in said stanchions, said axle extending transversely to the axis along which the force to be measured is applied; tubular sleeves rotatably supported on said axle, a pair of flanges formed integrally with each of said sleeves, one of said flanges extending radially from each end of each of said sleeves; attachment means pivotally attaching said force transmitting member to one point on each of said flanges, the points of attachment to the flanges on each of said sleeves being substantially equally spaced on opposite sides of a plane including the line of force application to the force receiving member and the axes of said sleeves; counterweight means having a mass substantially equal to that of the force transmitting member; pivotal attachment means securing said counterweight means to each of said flanges at a point diametrically opposite from the point of attachment of the same flange to the force transmitting member and radially equidistant from the axis of the sleeves; and means to measure the torsion strain in said sleeve.

10. A transient force measuring device as described in claim 9, said means to measure the torsion strain including four electrically strain sensitive filaments bonded to the surface of each of said sleeves and disposed thereon alternately at angles of equal magnitude and opposite sign relative to the shear planes created in said sleeve as the result of torsion strains therein, the four filaments on each sleeve being electrically interconnected to form a pair of torque sensitive Wheatstone bridge circuits; means to supply a potential difference across a pair of opposite terminals on each bridge circuit, said pairs being connected in parallel; and means to measure the unbalance potentials across the remaining junctions of said bridge circuits, said remaining junctions being connected in series relation to make unbalance potentials additive.

11. For measuring the recoil force applied to the shoulder of a shooter by a butt plate associated with the buttstock of a firearm, transient force measuring means including in combination an axle rigidly supported relative to said buttstock, said axle extending transversely to the axis along which the force to be measured is applied to the buttstock; a tubular sleeve rotatably supported on said axle; a pair of flanges formed integrally with said sleeve, one of said flanges extending radially from each end of said sleeve; first attachment means pivotally securing the butt plate to a point on one of said flanges; second attachment means pivotally securing the butt plate to a point on the other of said flanges, said attachment points being substantially uniformly spaced on opposite sides of a plane including the axis of said sleeve; a counterweight; pivotal attachment means securing said counterweight to a point on each of said end flanges, said points being each substantially diametrically opposite to said points of attachment to the butt plate, the product of the mass and moment arm of said counterweight being substantially equal to the product of the mass and moment arm of said butt plate; and means to measure the torsional strain in said sleeve as force is transmitted therethrough from said buttstock to said butt plate.

12. Transient force measuring means as defined in claim 11, said torsion strain measuring means including four electrically strain sensitive filaments bonded to the surface of said sleeve and disposed thereon alternately at angles of equal magnitude and opposite sign relative to the shear planes created in said sleeve as the result of torsion strains therein, said filaments being electrically interconnected to form a torque sensitive Wheatstone bridge.

FRANCIS G. DU PONT.

References Cited in the file of this patent

UNITED STATES PATENTS

| Number | Name | Date |
| --- | --- | --- |
| 1,827,560 | Binckley | Oct. 13, 1931 |
| 2,041,539 | Gaultier | May 19, 1936 |
| 2,446,537 | Hickman | Aug. 10, 1948 |
| 2,475,387 | Golden | July 5, 1949 |
| 2,523,464 | Golden | Sept. 26, 1949 |